US009923249B2

(12) United States Patent
Rejman et al.

(10) Patent No.: US 9,923,249 B2
(45) Date of Patent: Mar. 20, 2018

(54) RECHARGEABLE BATTERY PACK FOR A HANDHELD POWER TOOL

(71) Applicant: Robert Bosch GmbH, Stuttgart (DE)

(72) Inventors: Marcin Rejman, Waiblingen (DE); Rainer Glauning, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 152 days.

(21) Appl. No.: 14/969,054

(22) Filed: Dec. 15, 2015

(65) Prior Publication Data
US 2016/0172722 A1     Jun. 16, 2016

(30) Foreign Application Priority Data

Dec. 16, 2014   (DE) .......................... 10 2014 226 140
Sep. 25, 2015   (DE) .......................... 10 2015 218 447

(51) Int. Cl.
| | |
|---|---|
| *H01M 10/48* | (2006.01) |
| *H01M 2/10* | (2006.01) |
| *H01M 10/42* | (2006.01) |
| *B25F 5/02* | (2006.01) |
| *F21V 33/00* | (2006.01) |
| *H02J 7/00* | (2006.01) |

(52) U.S. Cl.
CPC ............ *H01M 10/488* (2013.01); *B25F 5/02* (2013.01); *B25F 5/021* (2013.01); *F21V 33/0084* (2013.01); *H01M 2/1055* (2013.01); *H01M 10/425* (2013.01); *H02J 7/0047* (2013.01); *H01M 2010/4271* (2013.01); *H01M 2220/30* (2013.01); *H02J 7/0045* (2013.01); *H02J 2007/005* (2013.01)

(58) Field of Classification Search
CPC ............ H01M 10/488; H01M 2/1055; H01M 10/425; H01M 2010/4271; H01M 2220/30; B25F 5/02; B25F 5/021; F21V 33/0084; F21V 33/008; H02J 7/0047; H02J 7/0045; H02J 2007/005
See application file for complete search history.

(56) References Cited

U.S. PATENT DOCUMENTS

| | | | | |
|---|---|---|---|---|
| 5,169,225 | A * | 12/1992 | Palm .................. | B25F 5/021 362/118 |
| 6,575,590 | B1 * | 6/2003 | Wadsworth ........... | B25B 21/00 362/119 |
| 2005/0135084 | A1 * | 6/2005 | Chen ................... | B25B 21/00 362/109 |
| 2009/0289805 | A1 * | 11/2009 | Patrick ................ | H01M 2/1022 340/636.11 |

(Continued)

*Primary Examiner* — Bao Q Truong
(74) *Attorney, Agent, or Firm* — Norton Rose Fulbright US LLP; Gerard Messina (57) ABSTRACT

A rechargeable battery pack for a handheld power tool, encompasses a housing and at least one interface unit for establishing a mechanical and electrical connection between the rechargeable battery pack and the handheld power tool and/or a charging device. The interface unit has at least one locking element for locking the rechargeable battery pack onto the handheld power tool, and an actuation element for actuating the locking element. The actuation element encompasses at least one light-emitting element for outputting an optical signal and/or for illumination.

35 Claims, 8 Drawing Sheets

(56) References Cited

U.S. PATENT DOCUMENTS

| | | | | |
|---|---|---|---|---|
| 2012/0100405 | A1* | 4/2012 | Noda | H01M 10/4207 |
| | | | | 429/92 |
| 2013/0335013 | A1* | 12/2013 | Suzuki | H01M 2/1055 |
| | | | | 320/107 |
| 2015/0188270 | A1* | 7/2015 | Knight | H01R 27/00 |
| | | | | 439/350 |
| 2015/0357683 | A1* | 12/2015 | Lohr | H01F 38/14 |
| | | | | 320/108 |

* cited by examiner

RECHARGEABLE BATTERY PACK FOR A HANDHELD POWER TOOL

RELATED APPLICATION INFORMATION

The present application claims priority to and the benefit of German patent application no. 10 2014 226 140.6, which was filed in Germany on Dec. 16, 2014, and German patent application no. 10 2015 218 447.1, which was filed in Germany on Sep. 25, 2015, the disclosures of both of which are incorporated herein by reference.

FIELD OF THE INVENTION

The present invention relates to a rechargeable battery pack for a handheld power tool, and to a handheld power tool. The present invention further relates to a rechargeable battery pack for a handheld power tool having an electric motor.

BACKGROUND INFORMATION

Handheld electrical power tools are believed to be understood in principle, and are provided with electricity either via a power socket or via a rechargeable battery pack that has a limited capacity.

Rechargeable battery packs of this kind have rechargeable batteries, as a rule a plurality of rechargeable battery cells connected in a parallel and/or series circuit. In the course of this Application a "rechargeable battery pack" is therefore to be understood as a rechargeable battery package, which may be made up of multiple rechargeable battery cells electrically connected together, which can store electrical energy that supplies energy required for operation of the handheld power tool, and which is received replaceably in a chamber, an interface, or the like of the handheld power tool. The rechargeable battery pack is associated with the handheld power tool by inserting or sliding the rechargeable battery pack into a complementary insertion socket of the device housing, the rechargeable battery pack being couplable to the device housing of the handheld power tool in such a way that upon coupling of the two housings, the power tool becomes electrically coupled and mechanically locked to the rechargeable battery pack. Electrical contacting is accomplished usually in the region of the locking apparatus. Rechargeable battery packs of this kind allow a high degree of flexibility when working.

Handheld power tools in which illumination of the working area is implemented by way of a suitable light-emitting element, for example an LED, are known from the existing art. A working-area illumination of this kind makes it easier, or in fact possible at all, to work with minimal external illumination or in unilluminated areas.

Also known are handheld power tools in which a charge status display, integrated into the housing of the handheld power tool or into a rechargeable battery pack, displays the charge status of the rechargeable battery pack. These charge status displays in many cases encompass one or more light-emitting arrangement.

In both cases, both with working-area illumination and with the charge status display, it proves to be difficult to find a position for these subassemblies that is ergonomically appropriate. The working-area illumination must be disposed so that it optimally illuminates the working area, and of course it must not be obscured by the user while handling the handheld power tool. The charge status display must be readily visible to the user so that he or she is, for example, always informed as to whether replacement or recharging of the rechargeable battery pack must be performed.

Positioning of the working-area illumination and charge status display subassemblies is made more difficult if both subassemblies are to be integrated simultaneously into a rechargeable battery pack, with the result that even less installation space is then available for the individual component. Positioning of the working-area illumination and of the charge status display becomes especially difficult when the two subassemblies are to be integrated together into a rechargeable battery pack that is usable in conjunction with different handheld power tools, for example a battery-operated circular saw and a battery-operated screwdriver. Because the rechargeable battery pack is used differently in different handheld power tools, and because handling by the user is also different, it is a difficult task to achieve an ergonomic disposition of the working-area illumination and charge status display in the rechargeable battery pack.

SUMMARY OF THE INVENTION

The object of the invention is to furnish a rechargeable battery pack for a handheld power tool which eliminates or at least reduces the disadvantages described above, and is usable with the greatest possible flexibility and is of economical and simple construction.

This object is achieved by a rechargeable battery pack as described herein. Advantageous embodiments, variants, and refinements of the invention are to be gathered from the further descriptions herein.

Provision is made according to the present invention that a rechargeable battery pack for a handheld power tool has a housing and at least one interface unit for establishing a mechanical and electrical connection between the rechargeable battery pack and the handheld power tool and/or a charging device. The interface unit encompasses at least one locking element for locking the rechargeable battery pack onto the handheld power tool, and an actuation element for actuating the locking element. The actuation element has at least one light-emitting element for outputting an optical signal and/or for illuminating a working area.

According to the present invention the actuation element has assigned to it the further function, in addition to unlocking of the locking element, of receiving the light-emitting element. A particular advantage results therefrom. The actuation element of the rechargeable battery pack must always be positioned so that it is readily accessible regardless of the handheld power tool with which the rechargeable battery pack is used. In addition, the actuation element must always be disposed so that inadvertent unlocking of the locking element during handling of the handheld power tool by the user is ruled out, i.e. the actuation element as a rule is not disposed in the user's grip region and thus is not obscured by the user.

Because, as described above, both requirements also apply regarding the positioning of the light-emitting element, the combination according to the present invention of the actuation element with the light-emitting element yields a synergistic effect that eliminates or at least reduces the problems recited above of the existing art, and makes possible a simpler disposition of the actuation element and of the light-emitting element.

Provision can be made here that the light-emitting element encompasses at least one partly transparent surface, with the result that a flexible disposition of the display function in the region of the actuation element is achieved and that versatile display capabilities are achieved depending on the configuration of the at least partly transparent surface.

A further embodiment encompasses a disposition in which the signal penetrates through the transparent surface and is generated by at least one first light-emitting body disposed in the interior of the housing, in particular by an LED, the signal advantageously being generated by a plurality of light-emitting bodies disposed in the interior of the housing, in particular by LEDs having different color spectra.

In a particular embodiment the optical signal displays a charge status. The display of charge status can be accomplished in various ways. Provision can be made in particular that the optical signal is variable in terms of display duration, intensity, and/or display color. The charge status can be displayed, for example, by way of a flashing optical signal. Alternatively or additionally, the charge status can be displayed by a change in intensity and/or in the display color, so that the charge status is displayed, for example, by way of a change in the display color from "green" for a very good charge status through "yellow" for a charge status that is just sufficient to "red" for one that is no longer sufficient. An intuitive display of the charge status can thereby be implemented in simple fashion.

Provision can further be made according to the present invention that the optical signal is configured in terms of intensity, area, and radiating angle in such a way that it is usable as a working-area illumination. This embodiment makes it easier, or in fact possible at all, to work with minimal external illumination and/or in unilluminated areas.

According to a further embodiment the optical signal, but in particular the charge status, is represented by way of at least two light-emitting bodies having different color spectra in the light-emitting element, the light-emitting element advantageously being configured to display various signals to the user, e.g. to display a remaining operating time, a remaining charge time, a time of day, or the like. It is additionally advantageous if the light-emitting element is subdivided into partial surfaces, so that different charge statuses can be displayed by way of those partial surfaces.

In a particular embodiment the light-emitting element encompasses a display unit, in particular a display panel. A display panel of this kind makes possible particularly flexible forms of display, for example a numerical percentage indication in the case of charge status, or a graphical symbol.

Advantageously, the optical signal is configured in terms of intensity, area, and radiating angle in such a way that it can be used both as working-area illumination and as a charge status display. In this case the advantages achieved with the invention encompass in particular the fact that simultaneous utilization of the light-emitting element as a working-area illumination system and as a display of various operating states of the tool is possible.

A further advantage is the particular synergistic effect that the three functions of actuation of the locking element, display of the charge status, and illumination of the working area are combined into one subassembly, which ensures ergonomic integration of the aforesaid functions into the rechargeable battery pack as compared with the existing art.

A configuration according to the present invention in which simultaneous utilization of the light-emitting element as a working-area illumination system and as a display of various operating states of the tool is provided for can be implemented, for example, in the following manner. Because the user advantageously is constantly informed as to the charge status of the rechargeable battery pack in order to protect the battery cells from deep discharge and to prevent a possible emergency shutdown associated therewith, it is advantageous if the display of charge status is integrated directly into the working-area illumination. For example, with a sufficiently high charge status the working-area illumination can be a continuous signal made up of, which may be, white light, which slowly changes to a differently colored signal as the charge status becomes increasingly low, and/or changes in intensity (i.e. brighter or dimmer) as the charge status drops. An additional change from a continuous working-area illumination signal to a flashing signal can be provided in order to signal a replacement of the rechargeable battery pack or an impending recharge of the rechargeable battery pack.

Provision is made according to the present invention that the rechargeable battery pack encompasses at least one sensor element for activation of the variable signal, provision may be made that the at least one sensor element is, in particular, an acceleration sensor that reacts to shaking by the user, and/or a photodiode. The signal can thereby, for example, be activated as soon as the rechargeable battery pack and/or the handheld power tool is moved, and/or when the photodiodes register a change in brightness.

Advantageously, the rechargeable battery pack has at least one contact element by way of which electrical signals of the handheld power tool are received and are converted in order to control the optical signal, thereby ensuring that the signal becomes activated, for example, as soon as a switching element is used to apply control to the electric motor. In addition, information relating to the handheld power tool can be transmitted via this contact element to the rechargeable battery pack and can thereby be displayed via the optical signal. Such information can be, for example, the instantaneous power consumption of the handheld power tool, which is displayed via the optical signal, for example as a percentage display on a display panel or as a color effect in the working-area illumination. It is also possible, however, to output on the display panel, for example, the identification of the handheld power tool or another device status.

At least one circuit board for receiving the at least one light-emitting body may be disposed in the interior of the housing. Provision is further made, in an advantageous embodiment, that the voltage supply to the circuit board and/or to the light-emitting bodies is switchable via at least one switching element, the switching element advantageously being disposed on the circuit board, which may be on a second circuit board. The locking element may be mechanically connected to the switching element in such a way that upon an actuation of the actuation element, the switching element is switched via the locking element. In order to implement this particularly advantageously, the mechanical connection between the locking element and the switching element is effected via an executing element, in particular via a rocker, or via a spring element. The result is a power supply to the circuit board or the light-emitting bodies which is easy to establish and which is reliable even after many actuations of the actuation element, so that the optical signal, in particular the current charge status, is outputted via the light-emitting element at least whenever the rechargeable battery pack is coupled onto or decoupled from the handheld power tool and/or the charging device, and/or the user actively presses the actuation element in order to query the charge status.

Provision can be made in this context that the actuation element can have at least one busbar for supplying voltage to the circuit board and/or to the light-emitting bodies, the busbar advantageously being integrated into the actuation element in particular by injection embedding, which is an economically and easily manufactured variant that moreover ensures low susceptibility to wear and/or fatigue breakage of the busbar.

The busbar advantageously has at least one connecting region for the attachment of electrical conductors, the electrical conductors advantageously being disposed flexibly, in particular by the formation of loops, in such a way that movement of the actuation element is ensured. What results therefrom is a power supply to the busbar which is simple to establish, and which is not subject to excessive wear phenomena and/or fatigue phenomena.

The rechargeable battery pack according to the present invention can be provided in a handheld power tool. A handheld power tool having a housing having a handle, and having a gear set disposed in the housing for transferring a torque generated by a drive motor to a tool receptacle rotating around a rotation axis, which encompasses a rechargeable battery pack described above, accordingly also constitutes a further subject of the invention.

Provision can be made in this context that the light-emitting element is disposed on the housing of the rechargeable battery pack in such a way that the optical signal illuminates the working area of the handheld power tool.

A switching element of the handheld power tool which serves to apply control to the motor of the handheld power tool may be electrically connected to a contact element of the rechargeable battery pack in such a way that upon actuation of the switching element, the optical signal illuminates the working area of the handheld power tool.

Advantageously, a switching element that is disposed on a circuit board, which may be on a second circuit board, and that serves for contacting of the light-emitting element, is electrically connected to at least one rechargeable battery cell of the rechargeable battery pack in such a way that upon actuation of the actuation element, the optical signal displays the charge status of the rechargeable battery pack.

It is particularly advantageous if the electric motor is an EC motor. Brushless EC motors of this kind on the one hand are almost maintenance-free, and because of their high efficiency allow a longer working time for each rechargeable battery charge, with the result that they are particularly efficient. In addition, handheld power tools having EC motors can be of very compact and lightweight construction; it is particularly advantageous that less heat loss also occurs, so that the devices do not become as hot as comparable devices and are thus longer-lived.

The use of a rechargeable battery pack according to the present invention is economical and space-saving, since as a result it is unnecessary to attach a separate light-emitting arrangement to the handheld power tool for working-area illumination.

In general, a "handheld power tool" is understood in the context of the Application as all handheld power tools having a tool carrier that can be caused to rotate or translate, and that is drivable directly, via a gear set, or via a planetary gear set by a drive motor, for example inline screwdrivers, battery-operated drills, impact drivers, multifunction tools, saws, shears, grinders, and/or impact drill drivers. A "transfer of electrical energy" is to be understood in this context in particular to mean that the handheld power tool is supplied with energy via the rechargeable battery pack.

Further features, possible applications, advantages, and embodiments of the invention are evident from the description below of the exemplifying embodiments of the invention that are depicted in the Figures. The description, the relevant Figures, and the claims contain numerous features in combination. One skilled in the art will also individually consider these features, in particular including the features of different exemplifying embodiments, and group them into appropriate further combinations. It is to be noted that the features presented are merely descriptive in nature and can also be used in combination with features of other refinements described above, and are not intended to limit the invention in any form whatsoever.

The invention will be described below in further detail with reference to exemplifying embodiments, identical reference characters being used for identical features. The drawings are schematic.

DETAILED DESCRIPTION

Figure 1:
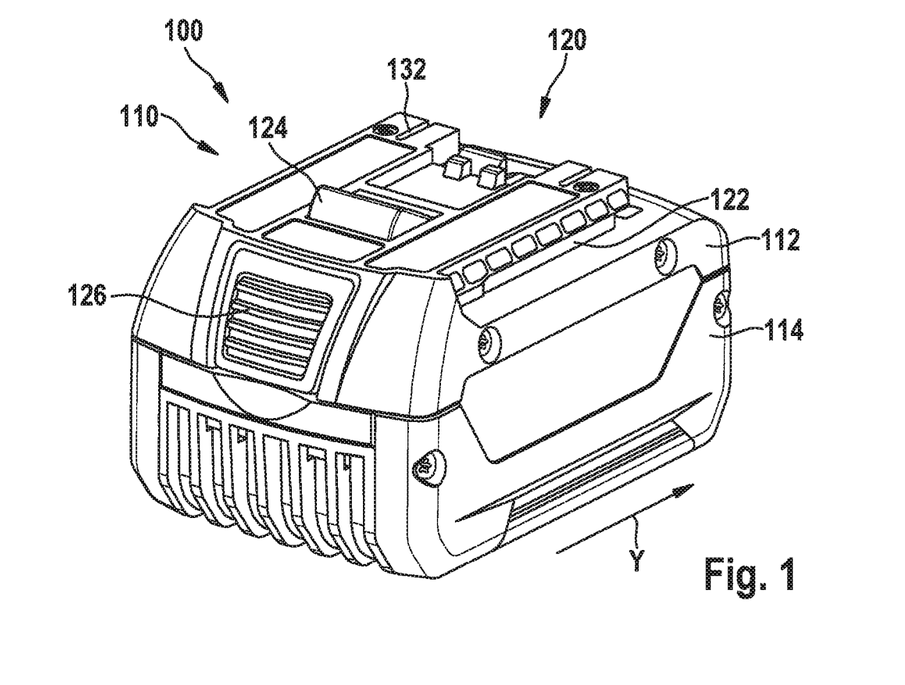
FIG. 1 is a perspective view of a rechargeable battery pack for a handheld power tool.
Figure 2:
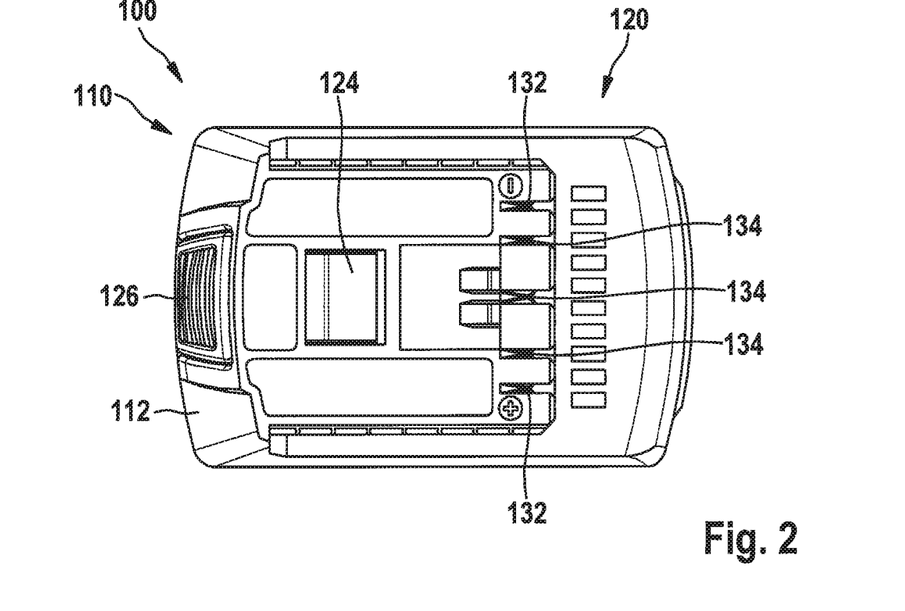
FIG. 2 is a plan view of the rechargeable battery pack of FIG. 1.

FIGS. 1 and 2 show a rechargeable battery pack 100. Rechargeable battery pack 100 encompasses a housing 110 that receives a plurality of rechargeable battery cells connected in parallel and/or serial fashion. Housing 110 encompasses a first housing element 112 and a second housing element 114. In the variant embodiment depicted, rechargeable battery pack 100 is embodied as a slide-in rechargeable battery pack. For releasable attachment of rechargeable battery pack 100 to a handheld power tool or charging device, rechargeable battery pack 100 has an interface unit 120 for releasable mechanical and electrical connection to a corresponding interface unit of a handheld power tool or charging device.

Interface unit 120 encompasses guidance elements 122 in the form of guidance grooves, which interact with corresponding guidance elements in the form of guidance ribs on the handheld power tool or charging device. Interface unit 120 further encompasses a locking element 124 in the form of a spring-loaded locking member. An actuation element 126, in the form of a pushbutton, is provided in order to actuate locking element 124. In order to lock rechargeable battery pack 100 to the handheld power tool or charging device, locking element 124 engages into a locking recess that is embodied on a corresponding interface unit of a handheld power tool or charging device.

In an alternative embodiment (not depicted), conversely, a locking element can be disposed both on the interface unit of the handheld power tool and on the interface unit of the charging device, and the corresponding locking recess can be provided on the interface unit of the rechargeable battery pack. Interface unit 120 furthermore encompasses contact elements 132, 134 for electrically contacting rechargeable battery pack 100 to the handheld power tool or charging device. Contact elements 132 are embodied as voltage contact elements, and serve as charging and/or discharging contact elements. Contact elements 134 are embodied as signal contact elements and serve for signal transfer from the rechargeable battery pack to the handheld power tool or charging device, and/or from the handheld power tool or charging device to the rechargeable battery pack.

Figure 3:
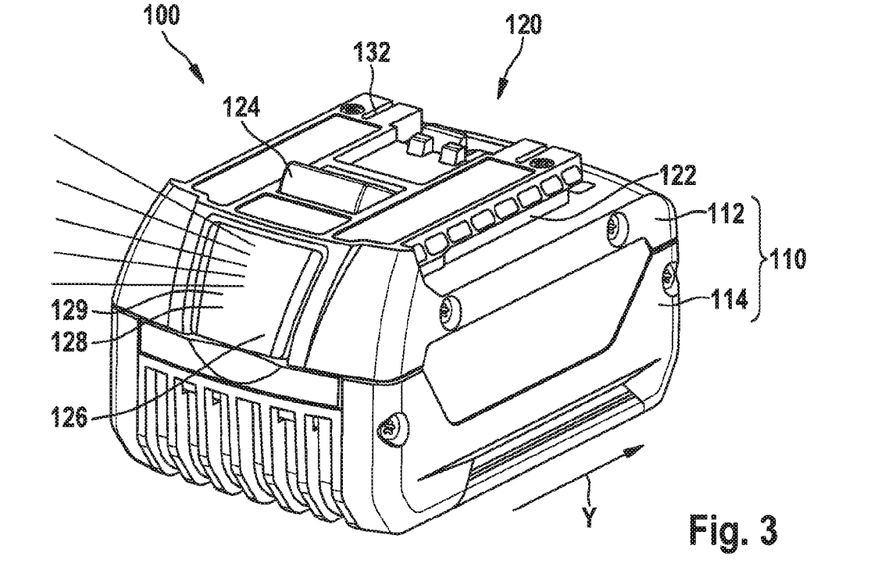
FIG. 3 is a perspective view of a first exemplifying embodiment of a rechargeable battery pack having a light-emitting element as a working-area illumination system.
Figure 4:
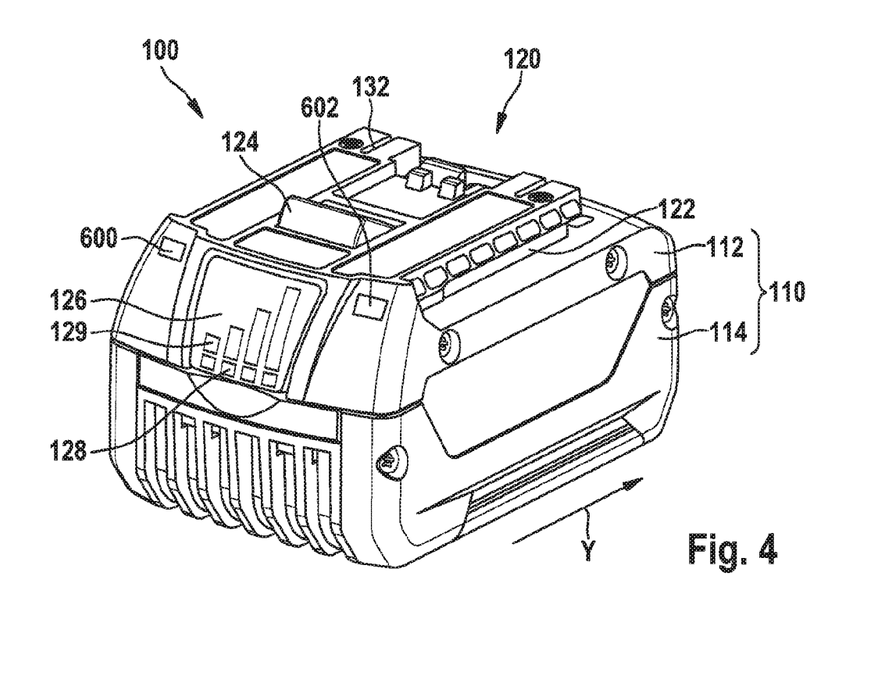
FIG. 4 is a perspective view of a second exemplifying embodiment of a rechargeable battery pack having a light-emitting element as a charge status display.
Figure 5:
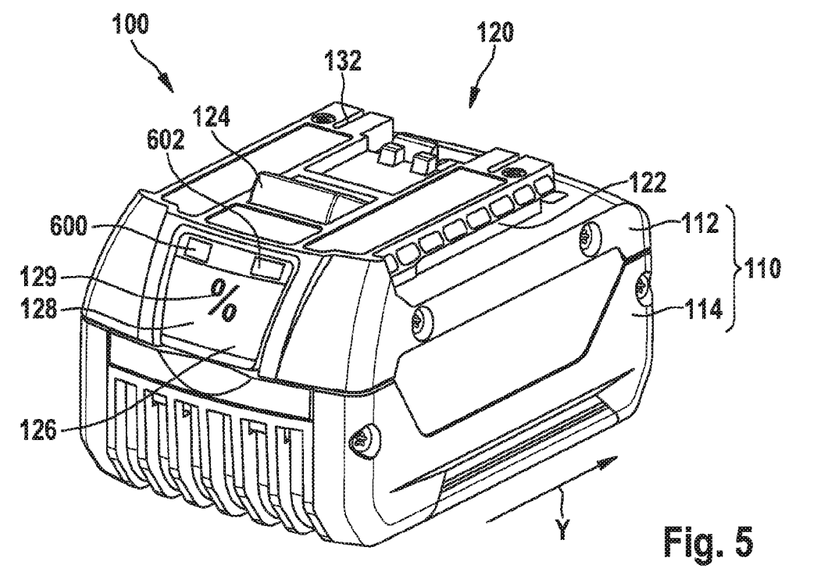
FIG. 5 is a perspective view of a third exemplifying embodiment of a rechargeable battery pack having a light-emitting element as a charge status display.

FIGS. 3 to 5 depict a variety of further exemplifying embodiments of a rechargeable battery pack 100 according to the present invention. Rechargeable battery pack 100 has a light-emitting element 128, integrated into actuation element 126, which serves to display the working-area illumination depicted in FIG. 3 and/or the operating status display depicted in FIGS. 4 and 5, in particular the charge status display of rechargeable battery pack 100.

In the embodiment depicted, light-emitting element 128 has for this purpose at least one transparent surface through which the signal penetrates. In the embodiment depicted, for example, the entire front of actuation element 126 that is visible on rechargeable battery pack 100 from outside can be made of a transparent plastic. A large region on the surface of rechargeable battery pack 100, which is ergonomically favorably located but conventionally serves only the purpose of actuating the locking element 124, is thus provided with a further function, which means a significant simplification in terms of positioning the various subassemblies of rechargeable battery pack 100.

Figure 6:
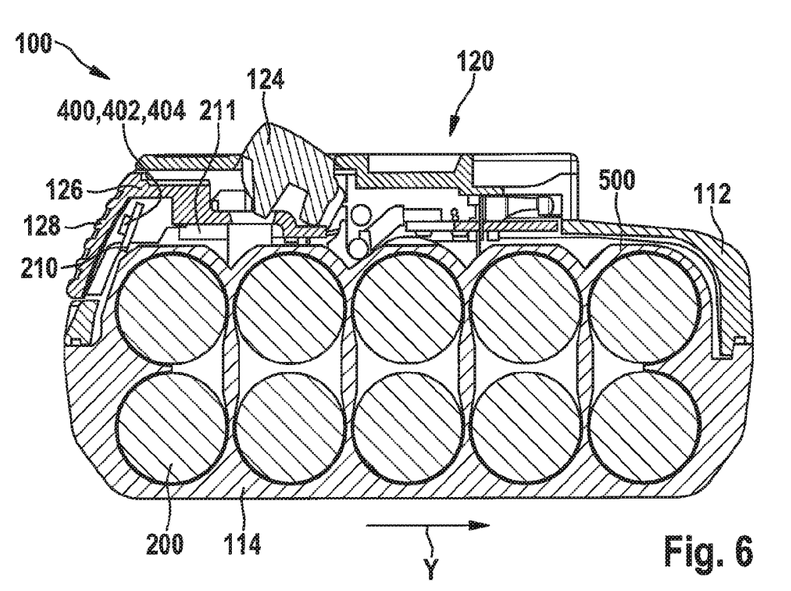
FIG. 6 is a side view of a rechargeable battery pack according to the present invention.

In the embodiment of FIG. 3, as also depicted in FIG. 6, the optical signal is generated by at least one light-emitting body 400 disposed in the interior of housing 110. In order to generate signals having different color spectra, it is advantageous here if a plurality of light-emitting bodies 400, 402, 404 having different color spectra are disposed in the interior of housing 110. The light-emitting bodies 400, 402, 404 that are used are, in particular, LEDs, since these are long-lived and economical, require only a small installation space, and moreover generate a bright, readily visible light with little power consumption.

The optical signal of light-emitting element 128 in FIG. 3 is configured, in terms of intensity, area, and radiating angle, in such a way that it optimally illuminates a working area of handheld power tool 300 with which rechargeable battery pack 100 is used. As already discussed, this is made easier by the fact that freer positioning of the working-area illumination system on rechargeable battery pack 100 is possible thanks to the combination of different functionalities in actuation element 128 and the design leeway thereby obtained.

As depicted in detail in FIGS. 4 and 5, the optical signal can also be used for other purposes, for example as a display of the current charge status or of further operating parameters of rechargeable battery pack 100 or of handheld power tool 300. For optimum implementation of this, light-emitting element 128 can have at least in part a display element 129, in particular an LED display panel, with which symbols or graphics can be displayed, for example numerical indications such as a percentage charge status of rechargeable battery pack 100 (see FIG. 5) or of bar graphs (as shown in FIG. 4).

Further information conveyed for display to the user can be, for example, a remaining operating time, a remaining charging time, a time of day, an instantaneous power consumption of handheld power tool 300, its model designation, or the like.

In order to transfer, from handheld power tool 300 to rechargeable battery pack 100, information that is to be displayed, rechargeable battery pack 100 advantageously has at least one contact element 132 by way of which electrical signals of handheld power tool 300 are received and are converted in order to control the optical signal, thus ensuring that the signal becomes activated, for example, as soon as a switching element is used to apply control to the electric motor of handheld power tool 300.

Figure 8:
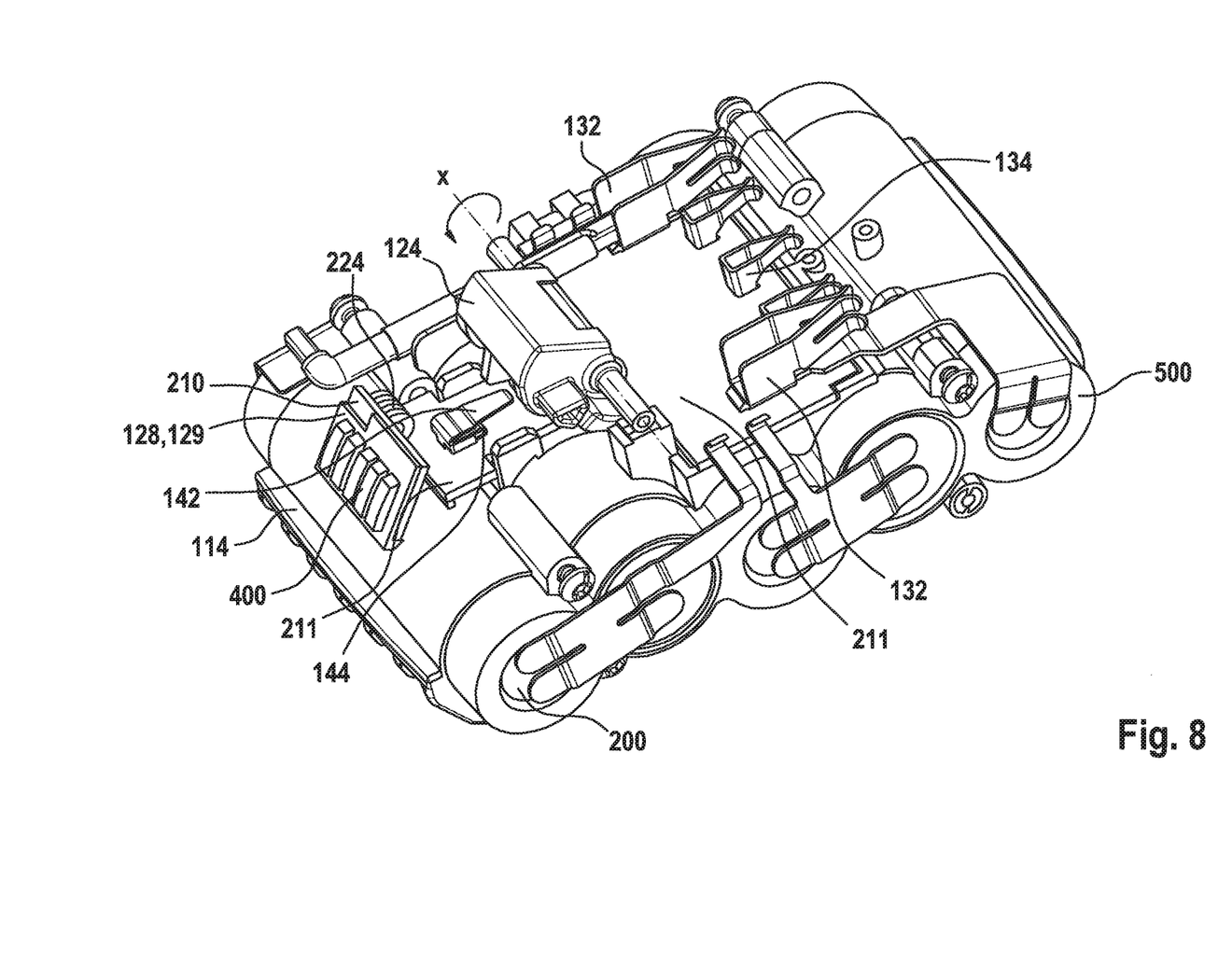
FIG. 8 is a perspective view of a rechargeable battery pack according to the present invention.

In a particular embodiment, the working-area illumination is combined with the operating status display, in particular the charge status display. Here light-emitting element 128 can supply a continuous, bright working-area illumination during normal operation of handheld power tool 300 by the user, as indicated in FIGS. 3 and 8. A critical operating parameter, for example a low charge status of rechargeable battery pack 100 or a motor overload of handheld power tool 300, can be signaled by light-emitting element 128 to the user by way of a change in that working-area illumination. Possible optical signals encompass a change from continuous illumination of the working area to an alternating, flashing illumination.

Alternatively, the intensity or the color of the illumination can also serve as an optical signal. What is thereby ensured in any case is that the user perceives the information regarding the critical operating parameters.

FIGS. 4 and 5 furthermore show sensor elements 600, 602 for activating the variable signal, provision may be made that sensor elements 600, 602 encompass in particular an acceleration sensor 602 that reacts to shaking by the user, and/or a photodiode 604. In this manner, the signal can be activated, for example, as soon as rechargeable battery pack 100 and/or handheld power tool 300 is moved and/or when photodiode 604 registers a change in brightness. This configuration allows light-emitting element 128 to be put into an idle state if rechargeable battery pack 100 and/or handheld power tool 300 has not been used for a certain period of time.

When rechargeable battery pack 100 and/or handheld power tool 300 is then used again, this is registered by at least one of sensor elements 600, 602, and light-emitting arrangement 128 is activated. Rechargeable battery energy can thereby be saved.

FIG. 6 depicts, in a side view of rechargeable battery pack 100, a possible disposition of actuation element 126 that encompasses light-emitting element 128. As is evident, light-emitting bodies 400, 402, and 404, which emit an optical signal and/or the working-area illumination through the transparent surface of light-emitting element 128 which constitutes the external boundary of actuation element 126, are mounted in the interior of housing 112, 114, and here also inside actuation element 126.

Figure 7:
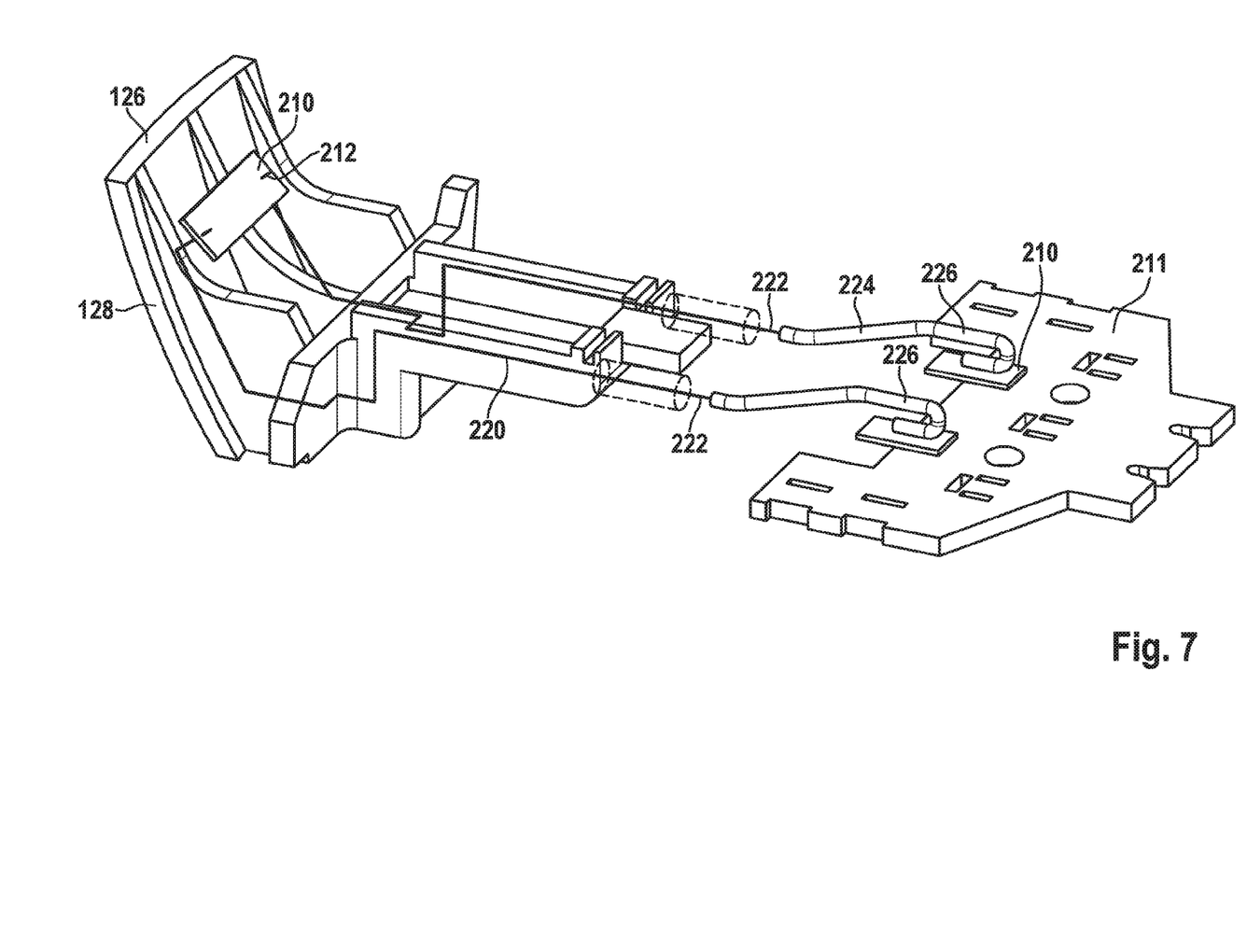
FIG. 7 is a perspective view of an actuation element for a rechargeable battery pack according to the present invention.

Also evident both in FIG. 6 and in FIG. 7 is a circuit board 210 for mounting and electrical connection of light-emitting bodies 400, 402, and 404. As shown in FIG. 7, circuit board 210 is connected in connection regions 212 to busbars 220 for supplying voltage to circuit board 210 and/or to light-emitting bodies 400, 402, and 404, busbars 220 in turn being connected to electrical conductors 224 in a connection region 222. In the exemplifying embodiment electrical conductors 224 are sufficiently flexible, thanks to the formation of loops 226, that a movement of actuation element 126 relative to housing 112, 114 of rechargeable battery pack 100 is ensured without causing the electrical terminals to be worn or indeed damaged. The primary function of actuation element 126, which is to actuate locking element 124, is thus not impaired by the reception of light-emitting element 128, while the supply of electricity to light-emitting element 128 is in turn permanently ensured. As indicated in FIG. 7, busbar 220 can be integrated into actuation element 126 by injection embedding. This technique represents an economical and easily manufactured variant that furthermore ensures a low susceptibility to wear and/or fatigue breakage of busbar 220.

Figure 9:
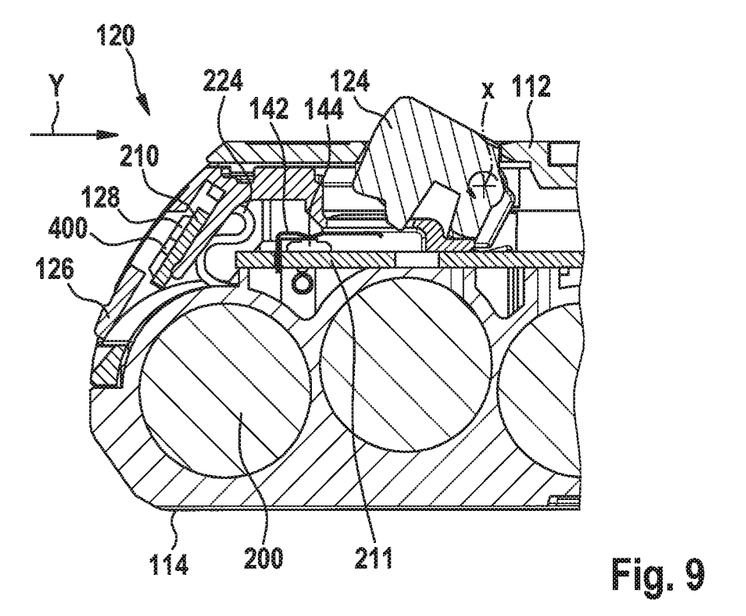
FIG. 9 is a detail side view of a rechargeable battery pack in the region of an actuation element, in a first embodiment.
Figure 10:
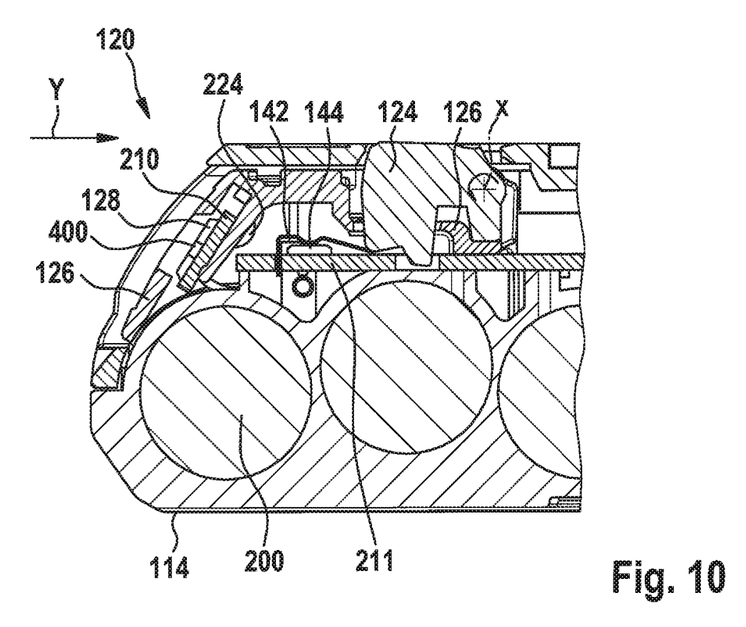
FIG. 10 is the detail side view of FIG. 9 of a rechargeable battery pack in the region of an actuation element, with the actuation element actuated.

FIG. 8 depicts rechargeable battery pack 100 without housing 110. It is thereby apparent that rechargeable battery cells 200 are held either (as in FIG. 8) in a cell holder 500 or in a cardboard sleeve, so that the individual rechargeable battery cells are disposed in mutually insulated fashion. Above cell holder 500, rechargeable battery pack 100 has a further circuit board 211 on which contact elements 132, 134, for electrically contacting rechargeable battery pack 100 to the handheld power tool or charging device, are disposed. Rechargeable battery pack 100 furthermore has light-emitting element 128, which for that purpose in turn encompasses display element 129 having a plurality of light-emitting bodies 400, so that the optical signal, and thus the bar chart that is to be presented in order to display the current charge status, can be generated. Rechargeable battery pack 100 furthermore encompasses locking element 124 in the form of a spring-loaded locking member. In order to lock rechargeable battery pack 100 onto handheld power tool 300 or onto the charging device, locking element 124 engages into a locking recess that is embodied on a corresponding interface unit of a handheld power tool 300 or charging device. As also depicted in FIGS. 9 and 10, a switching element 144 and an executing element 142, which in the variant depicted is embodied as a spring element or as a rocker, are also disposed on circuit board 211. First circuit board 210 is connected via electrical conductors 224 to second circuit board 211 so that a voltage supply to circuit board 210 and/or to light-emitting bodies 400, 402 can be ensured. The package of rechargeable battery cells 200 in cell holder 500 as depicted in FIG. 8, and the electronics disposed thereon, are positioned between the two housing components 120, 130 (not depicted in FIG. 8).

FIGS. 9 to 12 depict, on the basis of two variant embodiments, the manner in which a supply of voltage according to the present invention to circuit board 210 and/or to light-emitting bodies 400 can be enabled via at least one switching element 144. Interface unit 120 encompasses locking element 124 in the form of a spring-loaded locking member. In order to lock rechargeable battery pack 100 onto handheld power tool 300 or onto the charging device, locking element 124 engages into a locking recess that is embodied on a corresponding interface unit of a handheld power tool 300 or charging device. In the exemplifying embodiments depicted, by an actuation of actuation element 126, rechargeable battery pack 100 can be detached from handle 315 of handheld power tool 300 or from the charging device by sliding rechargeable battery pack 100 along a lower surface of handle 315 oppositely to the sliding direction Y.

FIGS. 9 and 10 depict a first variant embodiment. In FIG. 9, actuation element 126 of rechargeable battery pack 100 is in the locked position, locking element 124 engaging into the locking recess (not depicted) of a corresponding interface unit of a handheld power tool 300 or charging device. As depicted in FIG. 10, upon an actuation, the entire actuation element 126 slides in a Y direction in such a way that locking element 124 rotates around an axis X and thereby on the one hand releases from the corresponding interface unit of handheld power tool 300 or of the charging device, and on the other hand actuates switching element 144. In order to ensure this, the mechanical connection between locking element 124 and switching element 144 has an executing element 142, in particular a rocker or a spring element. Upon an actuation of actuation element 126, locking element 124 is thus rotated around an axis X with the result that executing element 142 is pressed onto switching element 144, with the result in turn that circuit board 210 and light-emitting bodies 400 are supplied with voltage.

Figure 11:
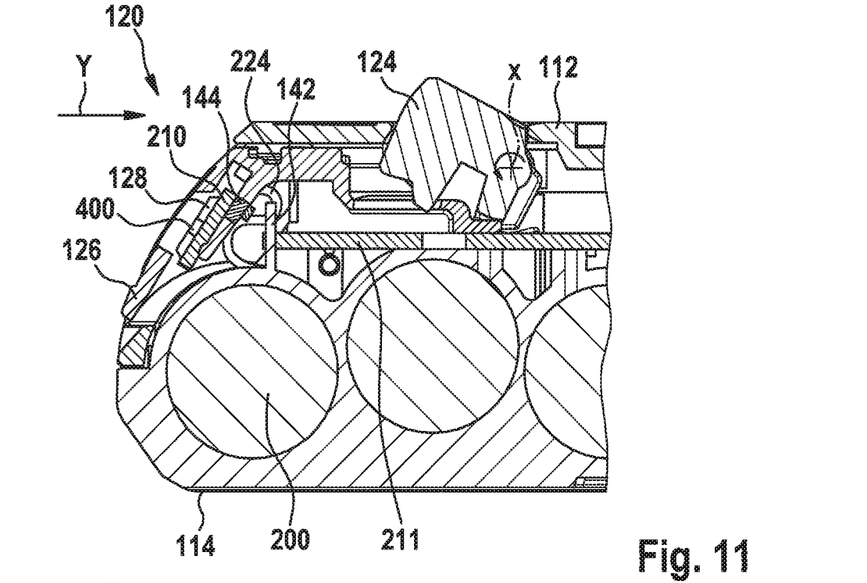
FIG. 11 is a side view of a rechargeable battery pack in the region of an actuation element, in a second embodiment.
Figure 12:
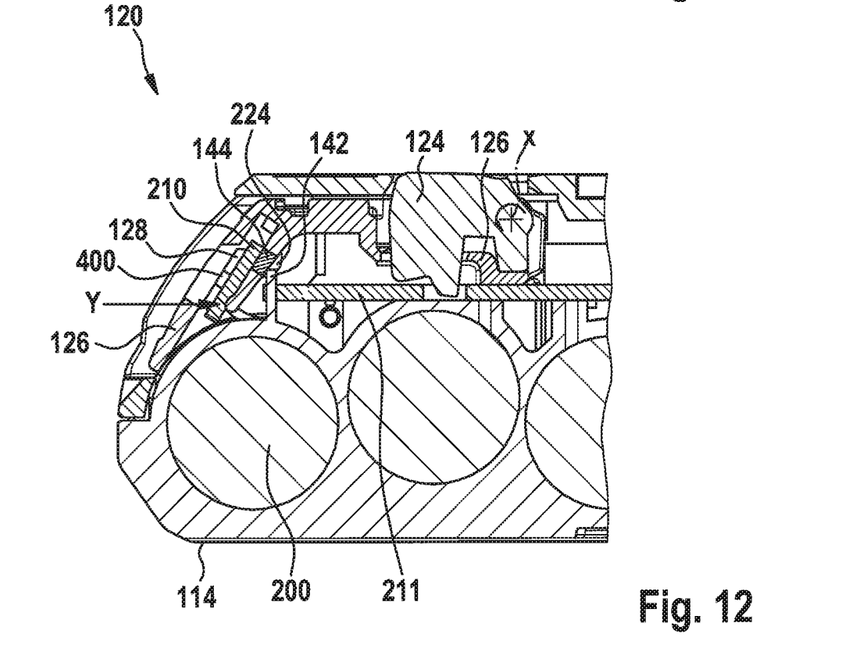
FIG. 12 is the detail side view of FIG. 11 of a rechargeable battery pack in the region of an actuation element, with the actuation element actuated.

FIGS. 11 and 12 depict a second variant embodiment. In FIG. 11 as well, actuation element 126 of rechargeable battery pack 100 is in the locked position, as is the case in FIG. 9. Switching element 144 is disposed, however, on circuit board 210 on which light-emitting element 128 and light-emitting bodies 400 are also disposed. As depicted in FIG. 12, executing element 142 is disposed in the interior of rechargeable battery pack 100 in such a way that upon an actuation of actuation element 126, switching element 144 is pressed in a Y direction against executing element 142, and is switched. Circuit board 210 and light-emitting bodies 400 are supplied with voltage so that the optical signal, in particular the current charge status, is outputted via light-emitting element 128 at least when rechargeable battery pack 100 is coupled onto handheld power tool 300 and/or onto the charging device, and/or when the user pushes actuation element 126.

Figure 13:
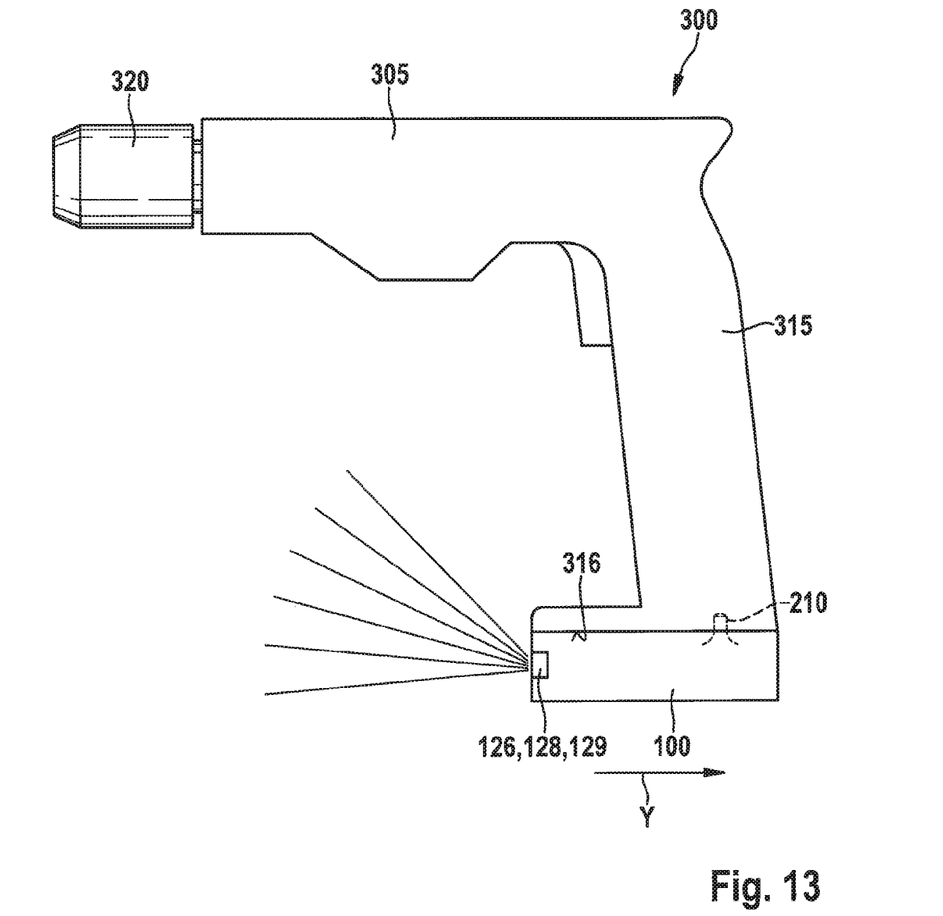
FIG. 13 is an exemplifying view of a handheld power tool having a rechargeable battery pack according to the present invention.

FIG. 13 shows an electrical appliance embodied as handheld power tool 300. In the embodiment as depicted, handheld power tool 300 is mechanically and electrically connectable to rechargeable battery pack 100 for cordless power supply. Handheld power tool 300 is embodied in FIG. 13, by way of example, as a battery-operated drill driver. Be it noted, however, that the present invention is not limited to battery-operated drill drivers, but instead can be applied to a variety of handheld power tools 300 that are operated with a rechargeable battery pack 100. Handheld power tool 300 has a base body 305 on which a tool receptacle 320 is mounted, and a handle 315 on which a rechargeable battery pack 100 according to the present invention is disposed in locked fashion. Rechargeable battery pack 100 is embodied as a slide-on rechargeable battery pack.

Upon attachment of rechargeable battery pack 100 to handheld power tool 300, receiving arrangement provided on handheld power tool 300, for example guidance grooves and guidance ribs, are brought into engagement with corresponding guidance elements 122 of rechargeable battery pack 100, rechargeable battery pack 100 being introduced in a sliding direction Y along the receiving arrangement of handle 315, and rechargeable battery pack 100 being slid along a lower outer surface 316 of handle 315, oriented substantially perpendicularly to the longitudinal direction of handle 315, into the rechargeable battery pack receptacle of a handheld power tool 300. In the position shown in FIG. 13, rechargeable battery pack 100 is mounted on handle 315 of handheld power tool 300 and is locked by interface unit 120 of rechargeable battery pack 100.

Evident in the variant embodiment depicted in FIG. 13 is light-emitting element 128, integrated into actuation element 126, which can be used as a working-area illumination system and/or as an operating status display, for example as a display of the charge status of rechargeable battery pack 100.

As is evident, the optical signal is configured, in terms of intensity, area, and radiating angle, in such a way that it illuminates the working area of handheld power tool 300. In this case light-emitting element 128 is oriented in such a way that it illuminates an area around tool receptacle 320. It is likewise evident from FIG. 8 that light-emitting element 128 is positioned in an ergonomically appropriate fashion on rechargeable battery pack 100 so that it is not obscured when handheld power tool 300 is handled by the user who grasps handheld power tool 300 by handle 315. This ensures that the user is informed by way of light-emitting element 128, for example by way of a change in the working-area illumination, as to a variety of operating parameters, for example a low charge status of rechargeable battery pack 100 or a motor overload of handheld power tool 300. Possible optical signals to the user encompass a change from a continuous illumination of the working area to an alternating, flashing illumination. Alternatively, the intensity or color of the illumination can also serve as an optical signal.

In addition to the embodiments described and illustrated, further embodiments are conceivable which can encompass further variations as well as combinations of features. The description of the Figures serves merely for an understanding of the invention.

What is claimed is:

1. A rechargeable battery pack for a handheld power tool, comprising:
   a housing; and
   at least one interface unit to establish a mechanical and electrical connection between the rechargeable battery pack and the handheld power tool and/or a charging device;
   wherein the interface unit includes at least one locking element to lock the rechargeable battery pack onto the handheld power tool, and an actuation element to actuate the locking element, and
   wherein the actuation element has at least one light-emitting element for outputting an optical signal and/or for illumination.

2. The rechargeable battery pack of claim 1, wherein the light-emitting element encompasses at least one partly transparent surface through which the signal penetrates, and/or a display unit.

3. The rechargeable battery pack of claim 1, wherein the signal is generated by at least one first light-emitting body disposed in the interior of the housing.

4. The rechargeable battery pack of claim 1, wherein the optical signal is variable in particular in terms of display duration, intensity, and/or display color.

5. The rechargeable battery pack of claim 1, wherein the optical signal is configured in terms of intensity, area, and radiating angle so that it is usable as a working-area illumination.

6. The rechargeable battery pack of claim 1, wherein the optical signal displays an operating state of the handheld power tool and/or of the rechargeable battery pack.

7. The rechargeable battery pack of claim 6, wherein the charge status is represented by at least two light-emitting bodies having different color spectra in the light-emitting element.

8. The rechargeable battery pack of claim 6, wherein the light-emitting element is subdivided into partial surfaces with which different charge statuses can be displayed.

9. The rechargeable battery pack of claim 1, wherein the light-emitting element is configured to display various signals to the user.

10. The rechargeable battery pack of claim 1, wherein the rechargeable battery pack encompasses at least one sensor element for activation of the variable signal.

11. The rechargeable battery pack of claim 10, wherein the rechargeable battery pack includes at least one further sensor element and/or a photodiode.

12. The rechargeable battery pack of claim 1, wherein the rechargeable battery pack includes at least one contact element by which electrical signals of the handheld power tool are received and are converted to control the optical signal.

13. The rechargeable battery pack of claim 3, wherein the actuation element has at least one circuit board, disposed in the interior of the housing, for receiving the at least one light-emitting element or for receiving the at least one light-emitting body.

14. The rechargeable battery pack of claim 13, wherein at least one voltage is supplied to the circuit board and/or to the light-emitting bodies via at least one electrical conductor.

15. The rechargeable battery pack of claim 13, wherein the voltage supply to the circuit board and/or to the light-emitting bodies is switchable via at least one switching element.

16. The rechargeable battery pack of claim 15, wherein the switching element is disposed on a circuit board; and the locking element is mechanically connected to the switching element so that upon an actuation of the actuation element, the switching element is switched via the locking element.

17. The rechargeable battery pack of claim 16, wherein the mechanical connection between the locking element and the switching element is effected via a rocker.

18. The rechargeable battery pack of claim 3, wherein the actuation element has at least one busbar for supplying voltage to the circuit board and/or to the light-emitting bodies.

19. The rechargeable battery pack of claim 18, wherein the busbar is integrated into the actuation element.

20. The rechargeable battery pack of claim 18, wherein the busbar has at least one connecting region for the attachment of electrical conductors, the electrical conductors being disposed flexibly, so that movement of the actuation element is ensured.

21. A handheld power tool, comprising:
   a housing having a handle;
   a gear set, disposed in the housing, for transferring a torque generated by a drive motor to a tool receptacle rotating around a rotation axis x; and
   a rechargeable battery pack for a handheld power tool, including:
      a housing; and
      at least one interface unit to establish a mechanical and electrical connection between the rechargeable battery pack and the handheld power tool and/or a charging device;
      wherein the interface unit includes at least one locking element to lock the rechargeable battery pack onto the handheld power tool, and an actuation element to actuate the locking element, and wherein the actuation element has at least one light-emitting element for outputting an optical signal and/or for illumination.

22. The handheld power tool of claim 21, wherein the light-emitting element is disposed on the housing of the rechargeable battery pack so that the optical signal illuminates the working area of the handheld power tool.

23. The handheld power tool of claim 21, wherein a switching element of the handheld power tool which serves to apply control to the motor of the handheld power tool is electrically connected to a contact element of the rechargeable battery pack so that upon actuation of the switching element, the optical signal illuminates the working area of the handheld power tool.

24. The handheld power tool of claim 21, wherein a switching element that is disposed on a circuit board, and that serves for contacting of the light-emitting element, is electrically connected to at least one rechargeable battery cell of the rechargeable battery pack so that upon actuation of the actuation element, the optical signal displays the charge status of the rechargeable battery pack.

25. The rechargeable battery pack of claim 1, wherein the light-emitting element encompasses at least one partly transparent surface through which the signal penetrates, and/or a display panel.

26. The rechargeable battery pack of claim 1, wherein the signal is generated by at least one first light-emitting body disposed in the interior of the housing, by a plurality of light-emitting bodies disposed in the interior of the housing.

27. The rechargeable battery pack of claim 1, wherein the signal is generated by at least one first light-emitting body disposed in the interior of the housing, by a plurality of light-emitting bodies disposed in the interior of the housing, in particular by LEDs having different color spectra.

28. The rechargeable battery pack of claim 1, wherein the optical signal displays an operating state of the handheld power tool and/or of the rechargeable battery pack, in particular a charge status of the rechargeable battery pack.

29. The rechargeable battery pack of claim 1, wherein the light-emitting element is configured to display various signals to the user, in particular to display a remaining operating time, a remaining charge time, or a time of day.

30. The rechargeable battery pack of claim 10, wherein the rechargeable battery pack includes at least one further sensor element, in particular an acceleration sensor that reacts to shaking by the user, and/or a photodiode.

31. The rechargeable battery pack of claim 15, wherein the switching element is disposed on a second circuit board; and the locking element is mechanically connected to the switching element so that upon an actuation of the actuation element, the switching element is switched via the locking element.

32. The rechargeable battery pack of claim 16, wherein the mechanical connection between the locking element and the switching element is effected via a rocker, in particular via an executing element.

33. The rechargeable battery pack of claim 18, wherein the busbar is integrated into the actuation element, in particular by injection embedding.

34. The rechargeable battery pack of claim 18, wherein the busbar has at least one connecting region for the attachment of electrical conductors, the electrical conductors being disposed flexibly, in particular by the formation of loops, so that movement of the actuation element is ensured.

35. The handheld power tool of claim 21, wherein a switching element that is disposed on a second circuit board, and that serves for contacting of the light-emitting element, is electrically connected to at least one rechargeable battery cell of the rechargeable battery pack so that upon actuation of the actuation element, the optical signal displays the charge status of the rechargeable battery pack.

* * * * *